United States Patent [19]

Kanda et al.

[11] Patent Number: 5,801,897
[45] Date of Patent: Sep. 1, 1998

[54] HEAD POSITIONING CONTROL SYSTEM FOR USE IN A DISK STORAGE SYSTEM

[75] Inventors: Hiroyuki Kanda; Tatsuharu Kusumoto; Masahide Yatsu, all of Tokyo, Japan

[73] Assignee: Kabushiki Kaisha Toshiba, Kanagawa-ken, Japan

[21] Appl. No.: 761,713

[22] Filed: Dec. 6, 1996

[30] Foreign Application Priority Data

Apr. 11, 1996 [JP] Japan .................................. 8-089585
Sep. 20, 1996 [JP] Japan .................................. 8-250551

[51] Int. Cl.⁶ .................................................. G11B 5/596
[52] U.S. Cl. ................................. 360/78.14; 360/78.04; 360/77.11
[58] Field of Search ..................... 360/77.11, 78.12, 360/78.14, 77.01, 75, 77.02, 77.06, 78.01, 78.04

[56] References Cited

U.S. PATENT DOCUMENTS 5,596,460  1/1997  Greenberg et al. ............... 360/78.14
5,610,808  3/1997  Squires et al. .................. 360/78.12 X
5,617,536  4/1997  Freitas et al. ................... 360/78.14 X

FOREIGN PATENT DOCUMENTS 7-230676  8/1995  Japan .

Primary Examiner—Muhammad N. Edun
Attorney, Agent, or Firm—Limbach & Limbach LLP

[57] ABSTRACT

In a disk drive, the CPU uses the cylinder code recorded on the servo area on the disk and thereby senses the present position of the read head. The cylinder codes are the addresses of the tracks formed on the disk and indicate the track position of the read head. In the servo area, the redundant data for identifying the boundary between adjacent tracks is recorded in addition to the cylinder code. When the read head is located near the track boundary, the CPU receives the cylinder code and redundant data and thereby determines which one of the boundaries with adjacent tracks to the track identified by the cylinder code the read head is located nearby. This makes it possible to determine the present position of the read head even when the read head accurately is positioned near the boundary between adjacent tracks.

14 Claims, 13 Drawing Sheets

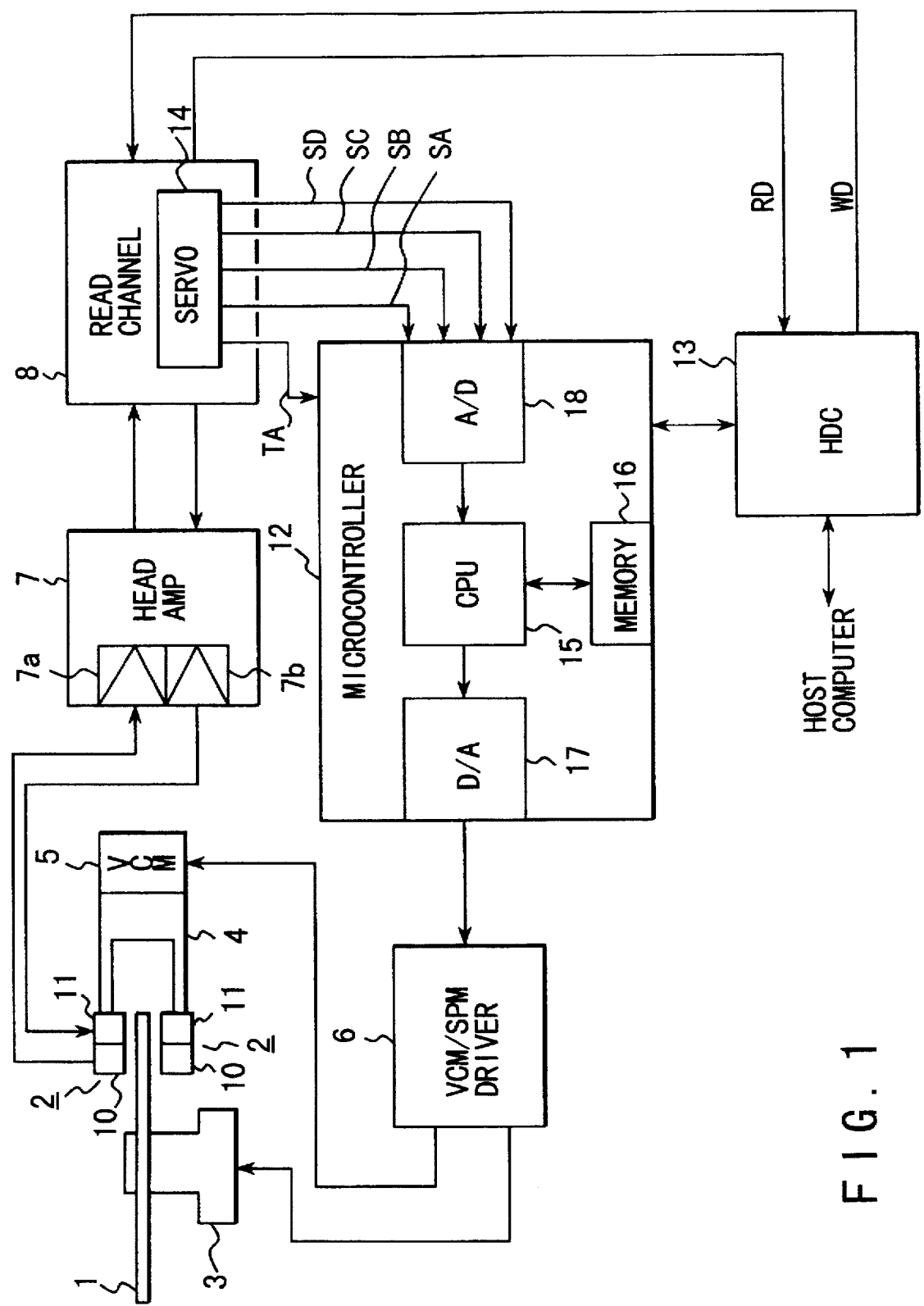
F I G. 1

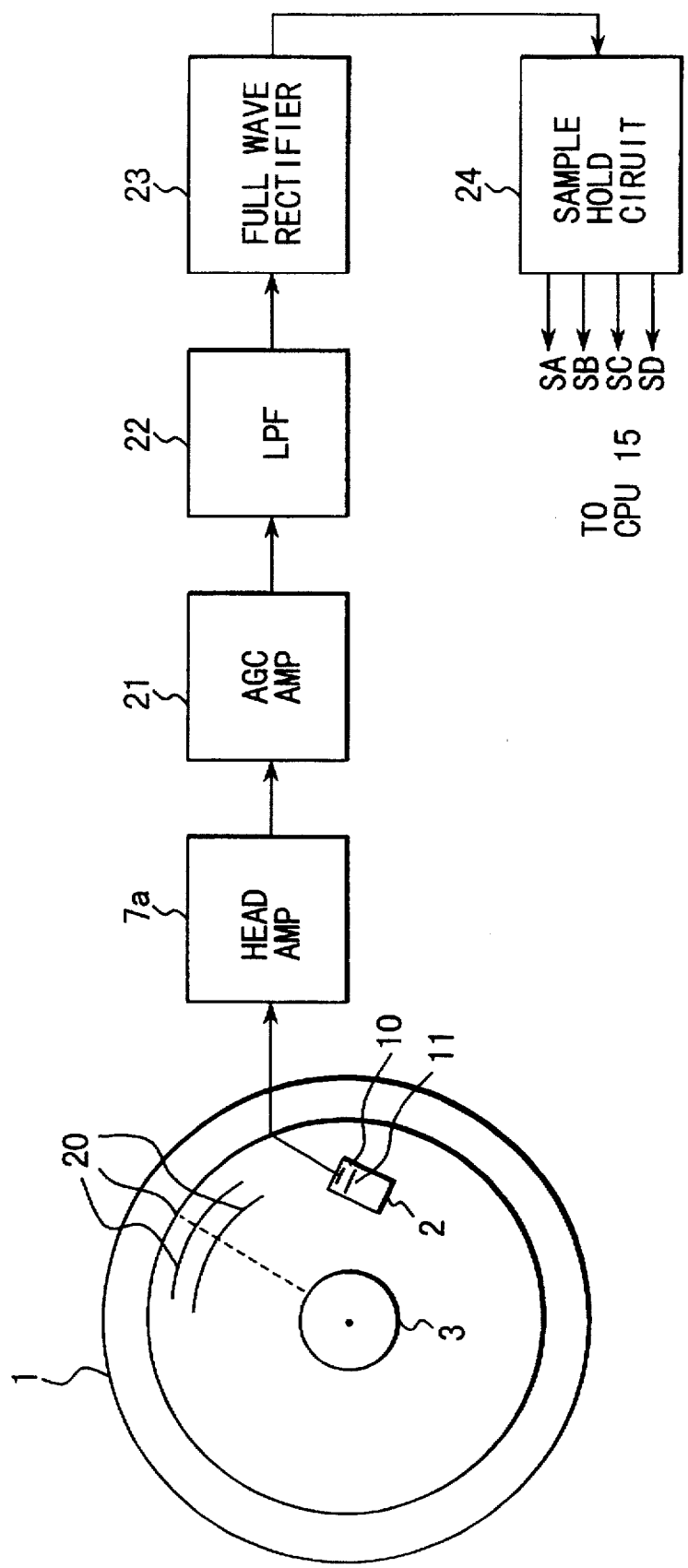
F I G. 2

FIG. 8

|  | 0 | 1 | 2 | 0 |
|---|---|---|---|---|
| N−4 | B−A | D−C | A−B | C−D |
| N−3 | C−D | B−A | D−C | A−B |
| N−2 | A−B | C−D | B−A | D−C |
| N−1 | D−C | A−B | C−D | B−A |
| N   | B−A | D−C | A−B | C−D |
| N+1 | C−D | B−A | D−C | A−B |
| N+2 | A−B | C−D | B−A | D−C |
| N+3 | D−C | A−B | C−D | B−A |
| N+4 | B−A | D−C |     |     |
~50
F I G. 9
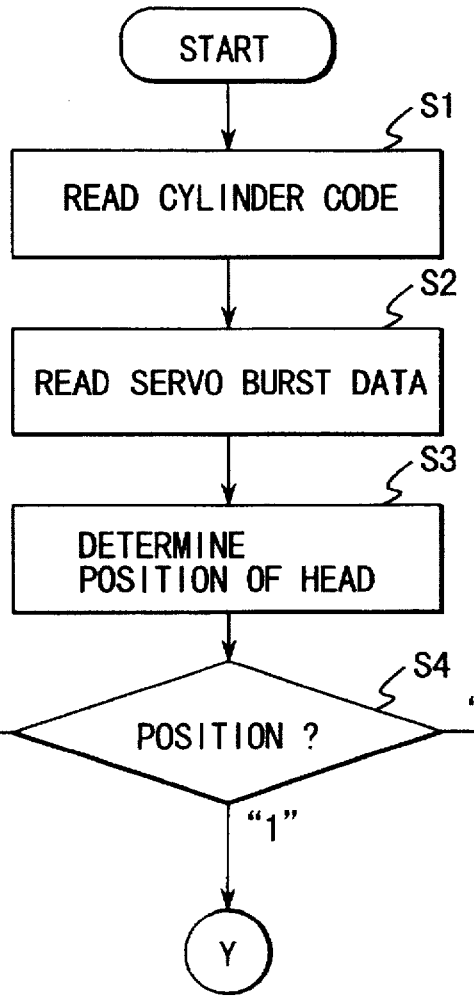
F I G. 10

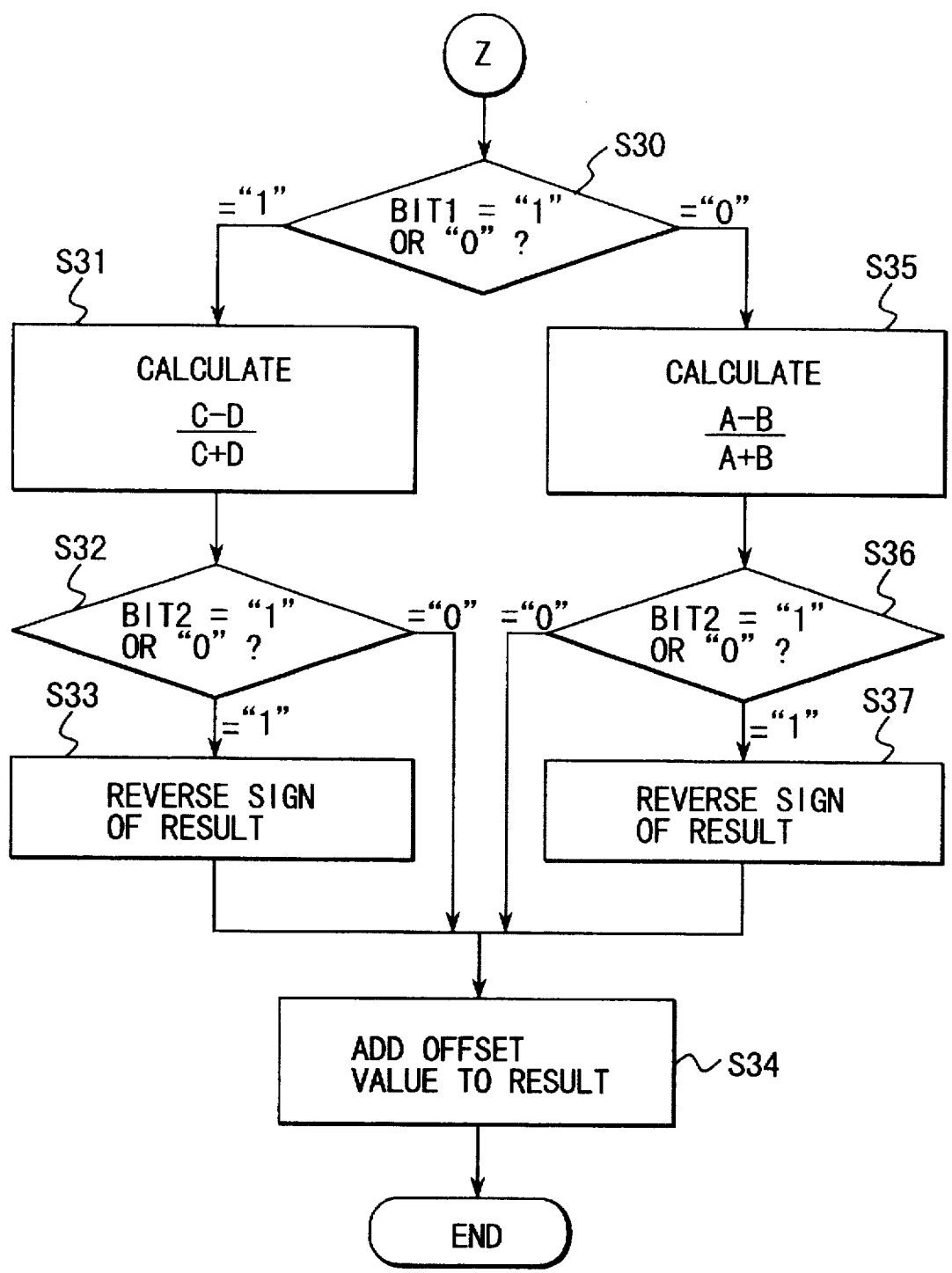
F I G. 13

HEAD POSITIONING CONTROL SYSTEM FOR USE IN A DISK STORAGE SYSTEM

BACKGROUND OF THE INVENTION

1. Field of the Invention

This invention relates to a head positioning control system which is applied to a disk drive using a disk as a recording medium and provides positioning control of the head on a track on the basis of the servo data recorded in the servo area on the disk.

2. Description of the Related Art

Conventional magnetic disk drives, such as hard disk drives (HDDs), use a disk as a recording medium, record data on the disk by means of a head, or reproduce the data from the disk. On the disk, a large number of tracks (cylinders) are formed as recording areas. Each track is divided into a plurality of data sectors. The data is accessed sector by sector, or on a sector basis.

The HDD is provided with a head positioning control system that positions the head in the target position (the track to be accessed) using the servo data recorded on the disk. The servo data is recorded in the servo areas arranged at regular intervals circumferentially on the disk. The servo data is roughly composed of cylinder codes (track addresses) and servo burst data. The cylinder codes are the addresses allocated to the individual tracks. The addresses are recorded in the Gray code. The servo burst data is composed of a first group of servo burst patterns A, B arranged in quadrature and a second group of servo burst patterns C, D arranged in quadrature.

The head positioning system recognizes the present position (track position) of the head on the basis of the cylinder code read by the head at the time of a seek operation that moves the head to the target track. Furthermore, when the system moves the head close to the target track, it senses the position of the head using the servo burst data read by the head, and on the basis of the sense result, executes track following control for positioning the head in the range of the target track.

Here, it is assumed that adjacent track N−1, track N, and track N+1 are formed and a head 2 is to be positioned on the target track N. On the basis of the cylinder code read by the head 2, the head positioning control system recognizes the track (cylinder) on which the head 2 is located, and when, for example, track N+1 is the present position, moves the head 2 to the target track N.

When a head 2a is positioned near the boundary between adjacent tracks N and N+1, there is a chance that the head 2a may read both of cylinder codes N and N+1. As a result, the system is uncertain whether to receive either cylinder code N or N+1 and may recognize the present track position of the head 2a erroneously. Specifically, for example, there is a chance that the system may input cylinder code N+1 and mistake the present track position of head 2a for a position near the boundary between track N+1 and track N+2, or a place on the opposite side of the track N. Should this happen, the system will move the head from a position separate from the actual present position to the target position and after the head have passed the target position, approaches the head to the target position. This makes the moving control of the head unstable, which lengthens the time required for the head to reach the target track, contributing to lower access speed.

In recent years, recording and reproducing split-type heads have attracted attention which use a MR (magnetoresistive) head as a read head and a combination of this read head and an inductive head as a write head to realize high recording density. The recording and reproducing split-type head consists of a composite head structure composed of a write head and a read head integrally combined with each other on the same slider. The read head is a reproduce-only head for reproducing the data from the disk. The write read is a recording head for recording data on a disk.

In the recording and reproducing split-type head, with both of the read head and the write head, an offset develops in the center of each head on the track. In both cases of data read/write operations, the system reads the servo data by means of the read head and effects positioning control of the head on the basis of the present position of the read head.

With the HDD using such a recording and reproducing split-type head, the system reads the cylinder code by means of the read head in a data write operation and moves the write head to the target track. At this time, to position the write head in the range of the target track, the read head is placed in a position deviated by the offset from the write head. Accordingly, as shown in FIG. 14, there is a chance that the read head may be positioned at the boundary between adjacent tracks and read the cylinder codes corresponding to the adjacent tracks in place of the cylinder code to be read.

On the other hand, as shown in FIG. 14, the servo burst data is composed of a first group of servo burst patterns A, B recorded in quadrature with a ½ track shift and a second group of servo burst patterns C, D recorded in quadrature with a single track shift. When positioning the head near the center of the track, the system produces a position signal from the servo burst patterns A, B read by the read head 2 and calculates an error in the amplitude value (digital value) of each position signal. In the positioning range of a ¼ track or more from the center of the track, the system produces a position signal from the servo burst patterns C, D and calculates an error in the amplitude value of each position signal. Specifically, during track following control, the system uses the servo burst patterns A, B in the positioning range of (the center of a track ± a ¼ track) and the servo burst patterns C, D in the positioning ranges outside that range (−½ track to −¼ track and ¼ track to ½ track).

The read head is required to read the servo burst data reliably in any position on the track. Since the width of the read head is narrower than the track pitch, however, a situation arises in which no position error value cannot be obtained from both of the servo burst patterns A, B or C, D in the case of position 2b as shown in FIG. 14.

SUMMARY OF THE INVENTION

A first object of the present invention is to provide a head positioning control system which enables the track position of the read head to be determined reliably even when the read head is located near the boundary between adjacent tracks and provides high-speed moving control of the head to the target track.

A second object of the present invention is to realize high-precision positioning control by enabling the position of the read head to be sensed reliably in positioning the head in the range of the track on the basis of the servo burst data read by the read head.

According to the present invention, there is provided a head positioning control system for a disk drive, comprising: a disk with a plurality of tracks for recording data, each track having servo areas in a plurality of places on it, the servo areas being areas on which not only the track addresses for identifying the track when the head is moved to a specified track and the servo burst data for sensing the position of the head in the track range but also redundant data for identifying adjacent tracks have been recorded; read means for reading the track address and the redundant data from the track on which the head is positioned; detecting means for reading the servo burst data from the track on which the head is positioned and sensing the position of the head in the range of the track corresponding to the track address read by the read means; and control means for providing moving control of the head from the present position of the head to the specified track and determining the position of the head in the track range including the track corresponding to the track address and its adjacent tracks on the basis of the redundant data read by the read means, when the present position of the head is determined on the basis of the track address read by the read means.

Furthermore, according to the present invention, there is provided a head positioning control system using a disk in which the servo burst data is made up of a first group of quadrature servo patterns A, B and a second group of quadrature servo patterns C, D, and each of a first positioning range with its center at the boundary between the first group of servo burst patterns A, B and a second positioning range with its center at the boundary between the second group of servo burst patterns C, D is recorded with a ⅓ track pitch in each track range. The control means provides positioning control of the head to the center of the first positioning range or second positioning range in the track range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of the important section of a disk drive related to the present invention;

FIG. 2 is a block diagram of the important section of the servo circuit of the disk drive relate to the present invention;

FIG. 8 shows the structure of the servo data related to a fifth embodiment of the present invention;

FIG. 9 is a diagram to help explain the operation related to the fifth embodiment;

FIGS. 10 to 13 are flowcharts to help explain the operation of the fifth embodiment.

DETAILED DESCRIPTION OF THE PREFERRED EMBODIMENTS

Figure 3:
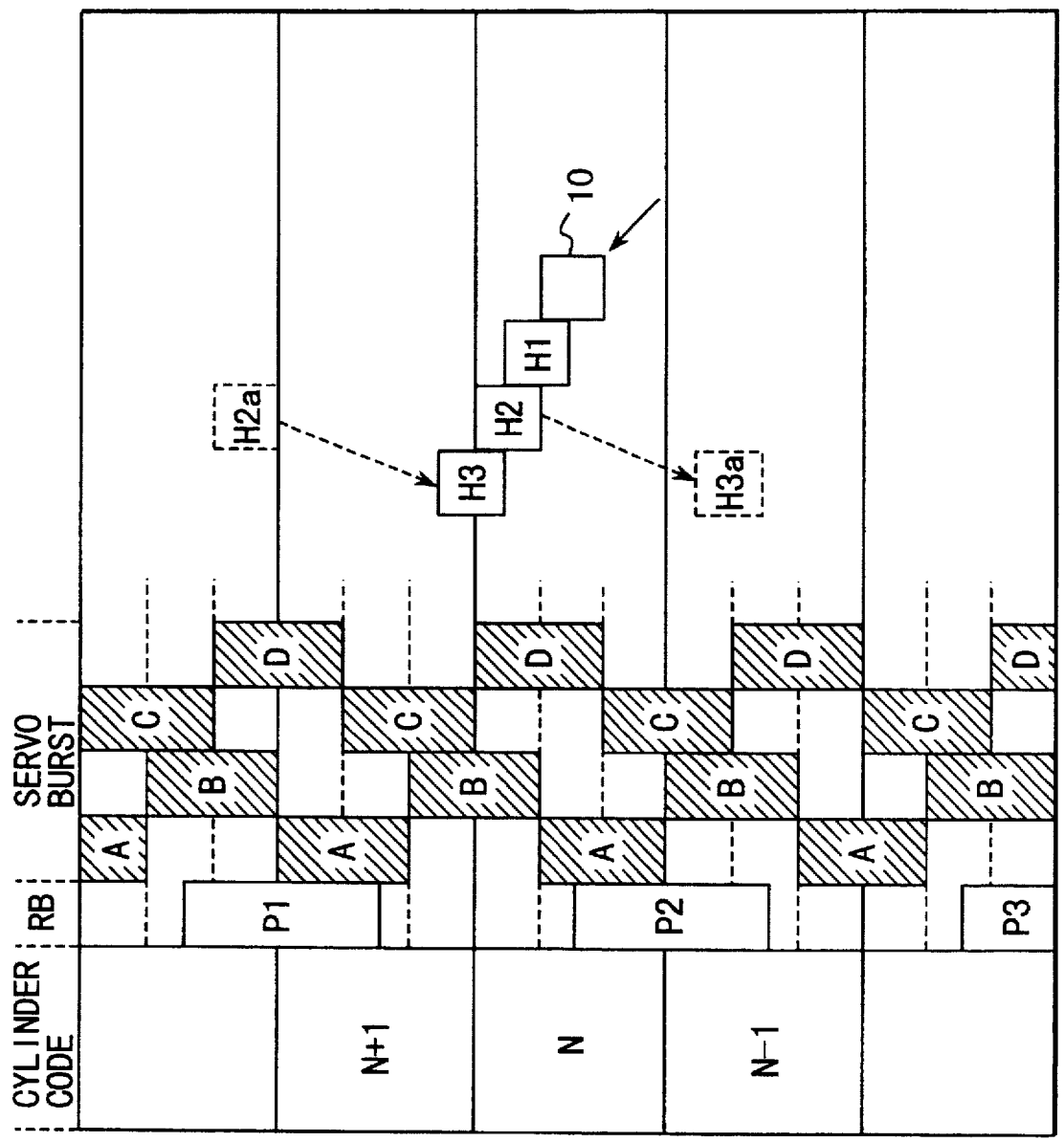
FIG. 3 shows the structure of the servo data related to a first embodiment of the present invention.

Hereinafter, referring to the accompanying drawings, embodiments of the present invention will be explained.

(Configuration of Disk Drive)

In the present invention, it is assumed that a hard disk drive (HDD) is used. As shown in FIG. 1, the HDD comprises a disk 1 serving as a recording medium, a head 2 for reading and writing data from and onto the disk 1, a read channel 8 for processing a read/write signal, a microcontroller 12 serving as a main control unit, and a disk controller (HDC) 13 constituting an interface between the HDD and the host computer.

One or more disks 1 are provided. Here, it is assumed that a single disk is used for the sake of convenience. The disk 1 is rotated at high speed by a spindle motor 3. As shown in FIG. 2, a large number of tracks 20 are arranged concentrically on the disk 1. On each track 20, in addition to the data sectors on which the user data is to be recorded, the servo areas in which the servo data containing the cylinder codes and servo burst data have been recorded are arranged as explained later.

The head 2 is a recording and reproducing split-type head in which a read head made of an MR head and a write head 11 made of an inductive head are mounted integrally on the same slider. The head 2 is held by a head actuator 4. Two units of the head 2 are provided so as to correspond to both sides of the disk 1: one head 2 for one side. The head actuator 4 is rotated by a voice coil motor (VCM) 5 and moves the head 2 over the radius of the disk 1. A VCM/SPM driver 6 controlled by the microcontroller 12 supplies a driving signal to the VCM 5, which then operates. The VCM/SPM driver 6 is a double driver for driving both of the VCM 5 and the spindle motor 3.

The read channel 8 is a signal processing circuit that is composed of a dedicated integrated circuit and processes a read/write signal. The read channel 8 includes a reproducing circuit that receives the read signal read from the disk 1 by the read head 10 and effects a reproducing process of the read signal into read data. The read channel 8 also includes a recording circuit that converts the write data WD transferred from the HDC 13 into a specific coded signal and outputs it as a write signal. A head amplifier 7 includes an amplifier 7a that amplifies the read signal outputted from the read head 10 and transfers the amplified signal to the read channel 8 and an amplifier 7b that amplifies the write signal outputted from the read channel 8 and transfers the amplified signal to the write head 11.

The read channel 8 includes a servo circuit 14 for reproducing the servo data related to the head positioning control system of the present invention. The servo circuit 14 extracts the servo data from the read signal read by the read head 10 and outputs the cylinder codes TA representing addresses and the data to the microcontroller 12. The servo circuit 14 outputs the amplitude values SA to SD of the position signals corresponding to the servo patterns A to D, respectively.

The microcontroller 12, which is one of the main components of the head positioning control system, comprises a microprocessor (CPU) 15, a memory 16, a D/A converter 17, and an A/D converter 18. The CPU 15 executes a head positioning control process according to the program previously stored in the memory 16. The D/A converter 17 converts the controlled variable calculated by the CPU 15 and necessary for positioning control into an analog signal and outputs the analog signal to the VCM/SPM driver 6. The A/D converter 18 converts into digital values the amplitude values SA to SD of the position signals corresponding to the servo burst patterns A to D, respectively, outputted from the servo circuit 14 and outputs the digital signals to the CPU 15. During track following control, using the amplitude values SA to SD corresponding to the received servo burst patterns A to D, respectively, the CPU 15 executes a position error computing process for sensing the position of the read head. The CPU 15 also recognizes the track position of the read head 10 on the basis of the cylinder code TA outputted from the servo circuit 14 during the seek operation and executes moving control to the target track.

The HDC 13, which is an interface controller for controlling the interface between the HDD and host computer, chiefly controls the transfer of read/write data RD, WD between the HDD and host computer.

As shown in FIG. 2, the servo circuit 14 includes a full-wave rectifier circuit 23 and a sample-hold circuit 24 and extracts from the read signal the amplitude values SA to SD corresponding to the servo burst patterns A to D, respectively. The read signal is read by the read head 10 and amplified by the head amplifier 7a and thereafter the amplified signal is inputted to the reproducing circuit of the read channel 8. The reproducing circuit includes an AGC (automatic gain control) amplifier 21 and an LPF (low-pass filter) 22 and performs a specific signal process on the read signal.

(First Embodiment)

FIG. 3 shows the structure of the servo data related to a first embodiment of the present invention. The servo data in the first embodiment includes cylinder codes, servo burst data, and redundant data RB. The cylinder codes (N+1, N, N−1) are gray codes that represent track addresses (track numbers) and are used to sense the track position of the read head 10. The servo burst data is made up of a first group of quadrature servo patterns A, B and a second group of quadrature servo patterns C, D. On each track, the boundary between servo burst patterns A, B and the boundary between servo burst patterns C, D are arranged at intervals of a ⅓ track.

The operation at the time when the CPU 15 provides positioning control of the read head 10 in the range of track N using the servo burst data will be described. As shown in FIG. 3, when being located in the range of track N, the read head 10 reads the position signals corresponding to the servo burst patterns A to D. The servo circuit 14 generates the amplitude values SA to Sd corresponding to the servo burst patterns A to D and outputs them to the microcontroller 12. The CPU 15 receives the amplitude values SA to SD in digital form via the A/D converter 18.

The CPU 15 executes the position error calculation of (A−B)/(A+B) using the amplitude values SA, SB corresponding to the servo burst patterns A, B and senses the position of the read head 10 in the positioning range with its center at the boundary between the servo burst patterns A, B. The CPU 15 also executes the position error calculation of (C−D)/(C+D) using the amplitude values SC, SD corresponding to the servo burst patterns C, D and senses the position of the read head 10 in the position range with its center at the boundary between the servo burst patterns C, D.

The CPU 15 executes the positioning control process, changing the servo burst pattern used as the position control signal at intervals of a ⅓ track pitch. For instance, the servo burst patterns A, B are changed to the servo burst patterns C, D and are further changed to the patterns A, B. Conversely, the servo burst patterns C, D are changed to the servo burst patterns A, B and are further changed to the patterns C, D. Thus, in the positioning range of the same track (N), there are two areas controlled by either the servo burst patterns A, B or the servo burst patterns C, D. By comparing the amplitude value error on one side with that on the other side, either the servo burst patterns A, B or the servo burst patterns C, D are determined.

(Seek Operation Using Redundant Data)

In the servo data of the embodiment, redundant data RB is added to the cylinder codes (N+1, N, N−1) for identifying the individual tracks at the boundary between adjacent tracks. The redundant data RB are parity bits P1 to P3 and are used to identify the boundary of which track the read head 10 is located on when the head is positioned near the boundary between adjacent tracks. Therefore, the parity bits P1 to P3 are arranged at the boundary between track N and track N−1, one of adjacent tracks, but are not arranged at the boundary between track N and track N+1, the other track.

Hereinafter, a seek operation using the redundant data RB will be described.

It is assumed that the read head 10 is moved from position H1 to position H2 and further from position H2 to position H3 as shown in FIG. 3. When the read head 10 exists in position H2 near the boundary between track N and track N+1, the CPU 15 recognizes the position H2 of the read head 10 on the basis of the cylinder code N read by the read head 10 and the servo burst patterns A to D as described earlier.

When the read head 10 exists in position H2 near the boundary between track N and track N+1, there is a chance that the read head may read both of cylinder code N and cylinder code N+1. Because of this, the CPU 15 is expected to receive cylinder code N+1 and recognize erroneously that the read head 10 exists in position H2a. When recognizing the position of the read head 10 erroneously, the CPU 15 moves the read head 10 from the present position H2a recognized erroneously to the target position H3. After the moving control has been executed, the read head 10 is moved from the present actual position H2 toward track N−1 and is placed in position H3a on track N−1 as shown in FIG. 3. In position H3a, the read head 10 reads cylinder code N−1, the CPU 15 executes control for moving the read head 10 toward the target position H3 on the track N. This makes the seek operation to the target position H3 unstable, lengthening the time required for the seek operation.

To overcome this problem, the present invention causes the CPU 15 to receive the cylinder code read by the read head 10 together with parity bits P1 to P3 serving as redundant data RB. Namely, the CPU 15 senses the present position of the read head 10 on the basis of the inputted cylinder code and senses the presence or absence of the parity bits P1 to P3. On the basis of the sense result of the presence or absence of the parity bits, the CPU 15 determines the position of the read head 10 according to the inputted cylinder code.

Specifically, when the read head 10 exists in position H2 near the boundary between track N and track N+1, it is assumed that the CPU 15 receives the cylinder code N+1 from the read head 10. At this time, the CPU 15 verifies cylinder code N+1 and the presence or absence of the parity bits (here, P1 or P2). Actually, because the read head 10 exists in position H2 near the boundary between track N and track N+1, the CPU 15 senses neither parity bit P1 nor P2. Thus, the CPU 15 recognizes that the present track position of the read head 10 is position H2 near the boundary between track N and track N+1. Then, the CPU 15 performs moving control so that the read head 10 may be moved from the actual present position H2 toward track N+1 or toward position H3.

Similarly, when the read head 10 is located at the boundary between track N and track N−1, the CPU 15 receives the cylinder code N−1 read by the read head 10 and parity bit P2. On the basis of the cylinder code N−1 and parity bit P2, the CPU 15 recognizes that the read head 10 is located near the boundary between track N and track N−1.

As described above, with the embodiment, in the servo area, the redundant data RB, including the parity bits P1 to P3 added to the cylinder code, have been recorded previously in the boundary between adjacent tracks. When determining the position of the read head 10 on the basis of the cylinder codes read by the read head 10, the CPU 15 can estimate the actual position of the read head 10, depending on the presence or absence of the redundant data RB. Therefore, when the read head 10 is located particularly near the boundary between adjacent tracks, the CPU 15 can determine the present position of the read head 10 almost exactly on the basis of the cylinder code read by the read head 10 without determining a position separate from the actual position. This enables the read head 10 to be moved stably to the target position, preventing the time required for the seek operation from being extraordinarily long.

(Second Embodiment)

Figure 4:
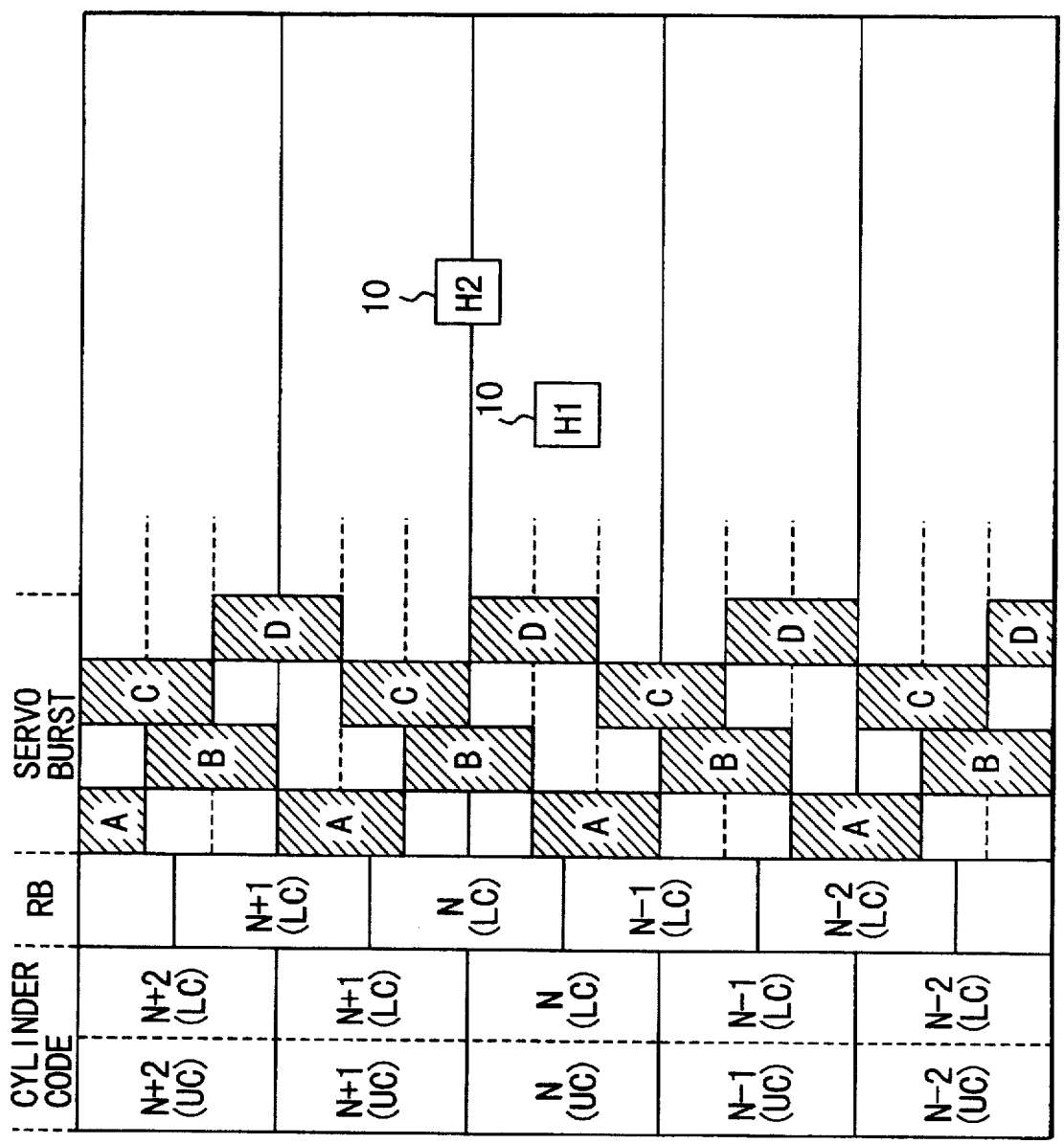
FIG. 4 shows the structure of the servo data related to a second embodiment of the present invention.

The servo data in a second embodiment of the present invention uses the same code as the low-order code (LC) of the cylinder codes serving as redundant data RB in the cylinder codes, servo burst data, and redundant data RB included in the servo area as shown in FIG. 4. As in the first embodiment, the servo burst data is composed of servo burst patterns A to D arranged so as to enable head positioning control with a ⅓ track pitch.

The second embodiment is characterized in that the same code as the low-order code (LC) of the cylinder codes is recorded in the servo area as the redundant data RB in such a manner that it is added to the cylinder codes (N+2, N+1, N, N−1, N−2) for identifying each track at the boundary between adjacent tracks. The redundant code RB corresponds to the parity bits in the first embodiment, and is used to determine which track of the boundary the read head 10 lies on when the head 10 is located at the boundary between adjacent tracks.

Hereinafter, a seek operation in the second embodiment will be explained concretely.

It is assumed that the read head 10 is located in the vicinity H1 of the center of the track N as shown in FIG. 4. The CPU 15 receives the high-order code (UC) and low-order code (LC) of the cylinder codes (N) read by the read head 10 as well as a redundant code RB. When receiving the low-order codes (LCs) of the cylinder codes (N) and (N−1) as redundant codes RB, the CPU 15 recognizes that the present position of the read head 10 is in the vicinity H1 of the center of the track N.

Now, it is assumed that the read head 10 is located at the boundary H2 between track N and track N+1. The CPU 15 receives the high-order code (UC) and low-order code (LC) of the cylinder codes (N) read by the read head 10 as well as a redundant code RB. At this time, the CPU 15 receives the low-order code (LC) of the cylinder codes (N) as the redundant code PR. As a result, the CPU 15 recognizes that the position of the read head 10 is in the range of the track corresponding to the cylinder codes (N) and on the basis of the redundant code RB that it is in the vicinity H2 of the boundary with track N+1. Conversely, when receiving the low-order code (LC) of the cylinder code (N−1) as the redundant code PB, the CPU 15 recognizes that the position of the read head 10 is in the range of the track corresponding to the cylinder code (N) and is in the vicinity of the boundary with track N−1.

In other words, the CPU 15 can position the read head 10 in position H2 at the boundary between track N and track N+1, using the high-order code (UC) of the cylinder codes (N) and the low-order code (LC) of the cylinder codes (N) that serves as a redundant code RB.

As described above, with the second embodiment, by recording the redundant code RB corresponding to the low-order code of the cylinder codes onto the boundary between adjacent tracks, it is possible to estimate the boundary of which adjacent track the read head 10 is located nearby in the range of the track corresponding to the cylinder codes. In other words, the CPU 15 can position the read head 10 in the vicinity of the center of the track, using the high-order code (UC) and low-order code (LC) of the cylinder codes. Furthermore, by using the high-order code (UC) of the cylinder codes and the redundant code RB, it is possible to position the read head 10 in the vicinity of the boundary with either adjacent track in the range of the track.

Figure 5:
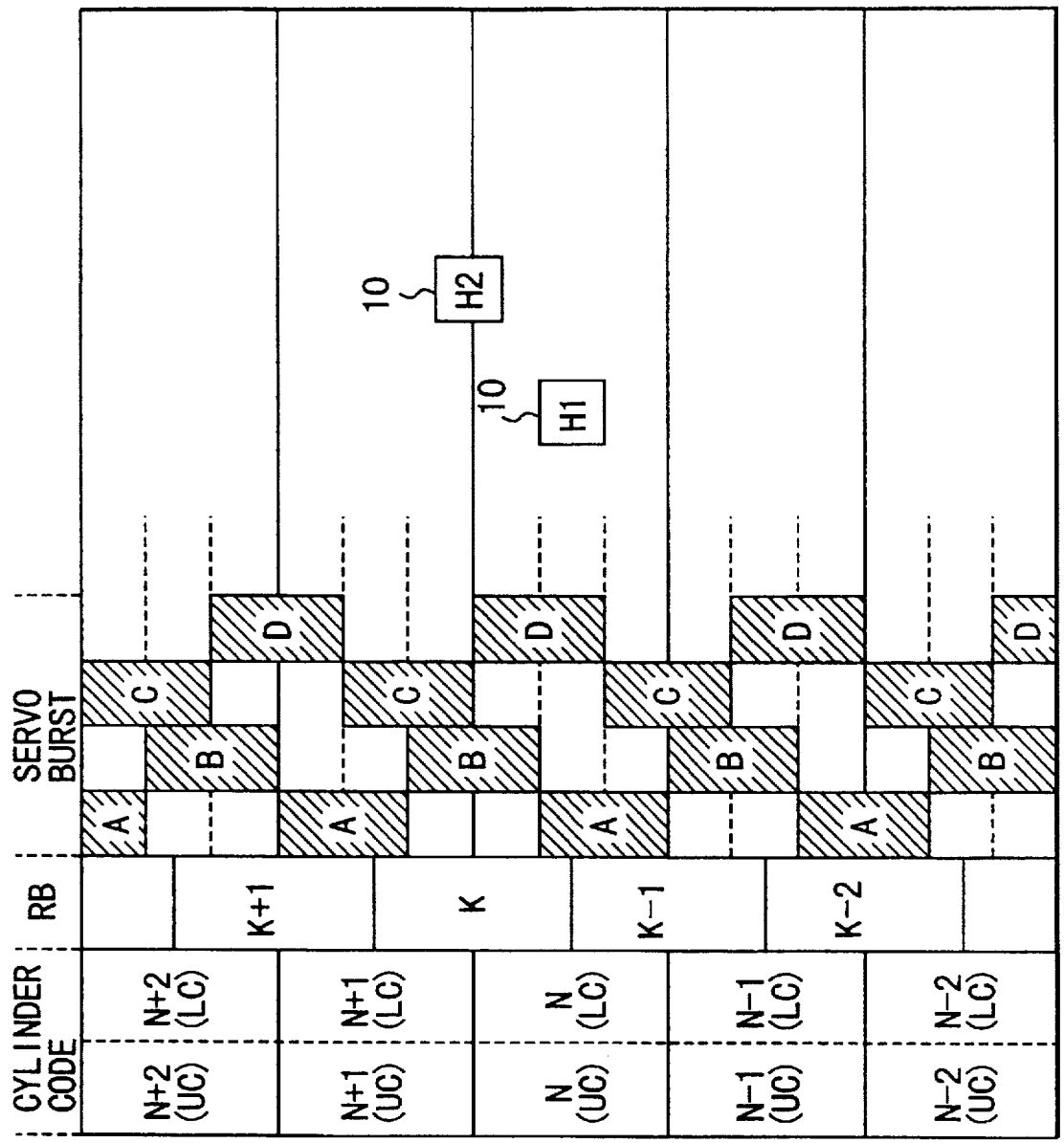
FIG. 5 shows the structure of the servo data related to a modification of the second embodiment.

FIG. 5 shows a modification of the second embodiment. In the modification, the servo data has an absolute position code (K+1, K, K−1, K−2 . . . ) which indicates the boundary between adjacent tracks, and which is used as the redundant data RB, instead of the low-order code (LC).

(Third Embodiment)

Figure 6:
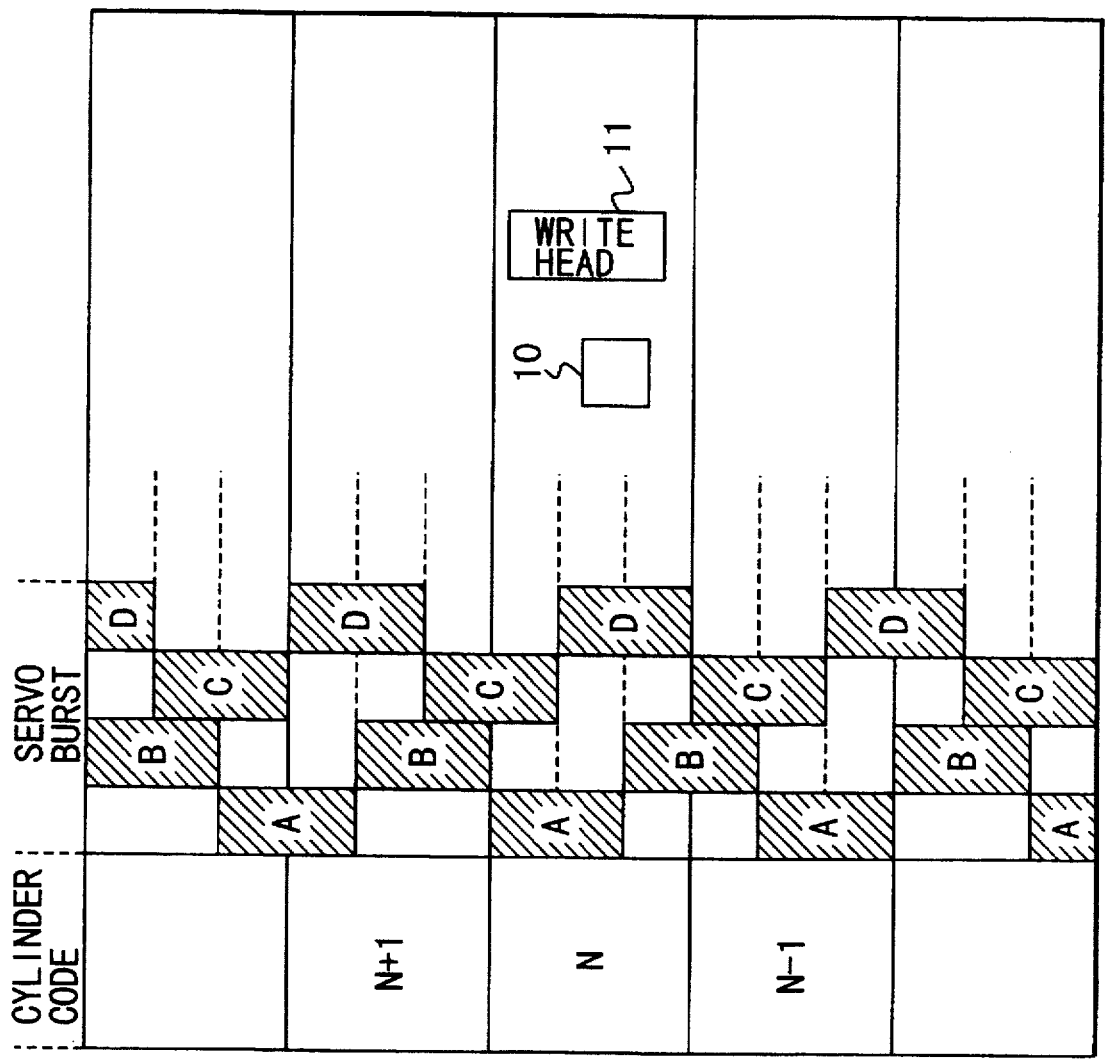
FIG. 6 shows the structure of the servo data related to a third embodiment of the present invention.

In a third embodiment of the present invention, it is assumed that the range of each track (N+1, N, N−1) on the disk 1 is trisected and each of the servo burst patterns A to D of servo burst data is recorded at interval of a ⅔ track pitch (as shown in FIG. 6). Specifically, the servo burst data is such that the positioning range based on the comparison result of a first group of servo burst patterns A, B and the positioning range based on the comparison result of a second group of servo burst patterns C, D are arranged alternately at intervals of about a ⅓ track.

When the CPU 15 provides positioning control of the read head 10 in the range of track (N), for example, it executes a position error computing process using the first group of servo burst patterns A, B in the positioning range on the track (N+1) side of the adjacent tracks for the servo burst patterns A to D read by the read head 10. Specifically, the CPU 15 executes the position error calculation of (A−B)/(A+B) using the amplitude values SA, SB corresponding to the servo burst patterns A, B and senses the position of the read head 10 in the positioning range with its center at the boundary between the servo burst patterns A, B. In the positioning range on the track (N−1) side of the adjacent tracks, the CPU executes the position error computing process using the second group of servo burst patterns C, D. Specifically, the CPU 15 executes the position error calculation of (C−D)/(C+D) using the amplitude values SC, SD corresponding to the servo burst patterns C, D and senses the position of the read head 10 in the positioning range with its center at the boundary between the servo burst patterns C, D.

Therefore, the CPU 15 has two areas controlled by either the servo burst patterns A, B or the servo burst patterns C, D in the positioning range of the same track (N). During a write operation, the CPU 15 can place the write head 11 in the target position by changing the positioning range of the read head 10 on the same track (N). In other words, the read head can be moved on each track with a ⅓ track pitch, so the width of the read head 10 can be set at the track pitch, that is, a ⅓ track pitch width+α. As a result, the read head 10 can read the servo burst data from any place on the track reliably.

The servo burst patterns A to D in the fourth embodiment are structured without joints. Specifically, during the manufacture of HDDs, when the servo burst data is recorded on a disk 1 by means of a special servo information writing device called a servo writer, each servo burst pattern is recorded in a single write operation by setting the condition that the gap width (head width) of the write head is ⅔ or more of the track pitch. Accordingly, joints can be eliminated in the same servo burst patterns A to D, so that it is possible to avoid a situation where the accuracy of the joints and the magnetic flux leakage from the edge of the write head have an adverse effect on the joints.

(Fourth Embodiment)

A fourth embodiment of the present invention relates to a method of setting cylinder codes for the data tracks (N+2, N+1, N, N−1, N−2) in the servo burst pattern structure of the fourth embodiment. The cylinder codes are address information for identifying each track as described earlier. In general, as shown in FIG. 6, absolute cylinder codes (N+1, N, N−1) are set so as to correspond to the individual tracks on a one-to-one basis. With this setting method, the track numbers (addresses) on the system correspond to the actual track numbers (addresses) on a one-to-one basis.

Figure 7:
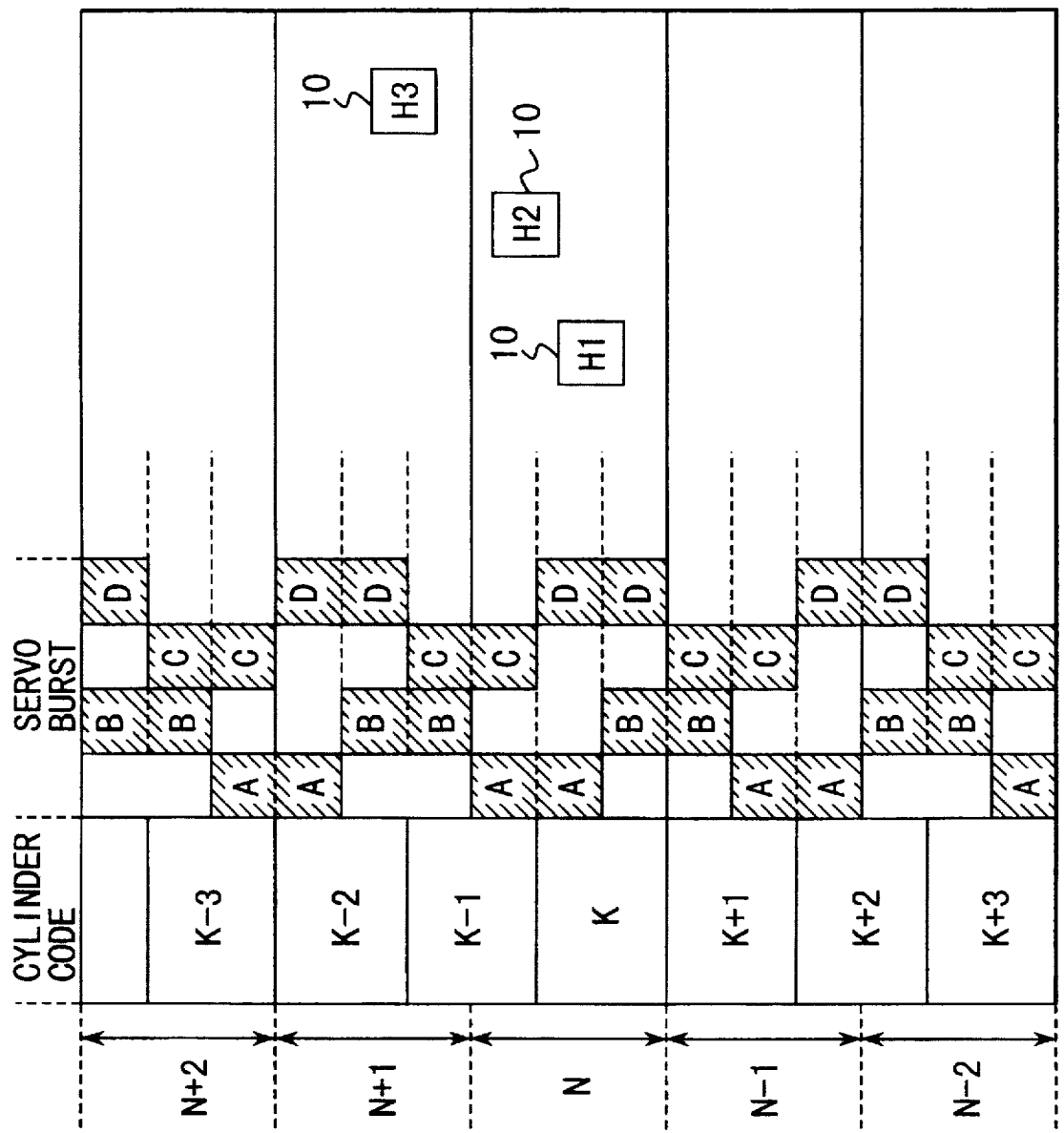
FIG. 7 shows the structure of the servo data related to a fourth embodiment of the present invention.
Figure 11:
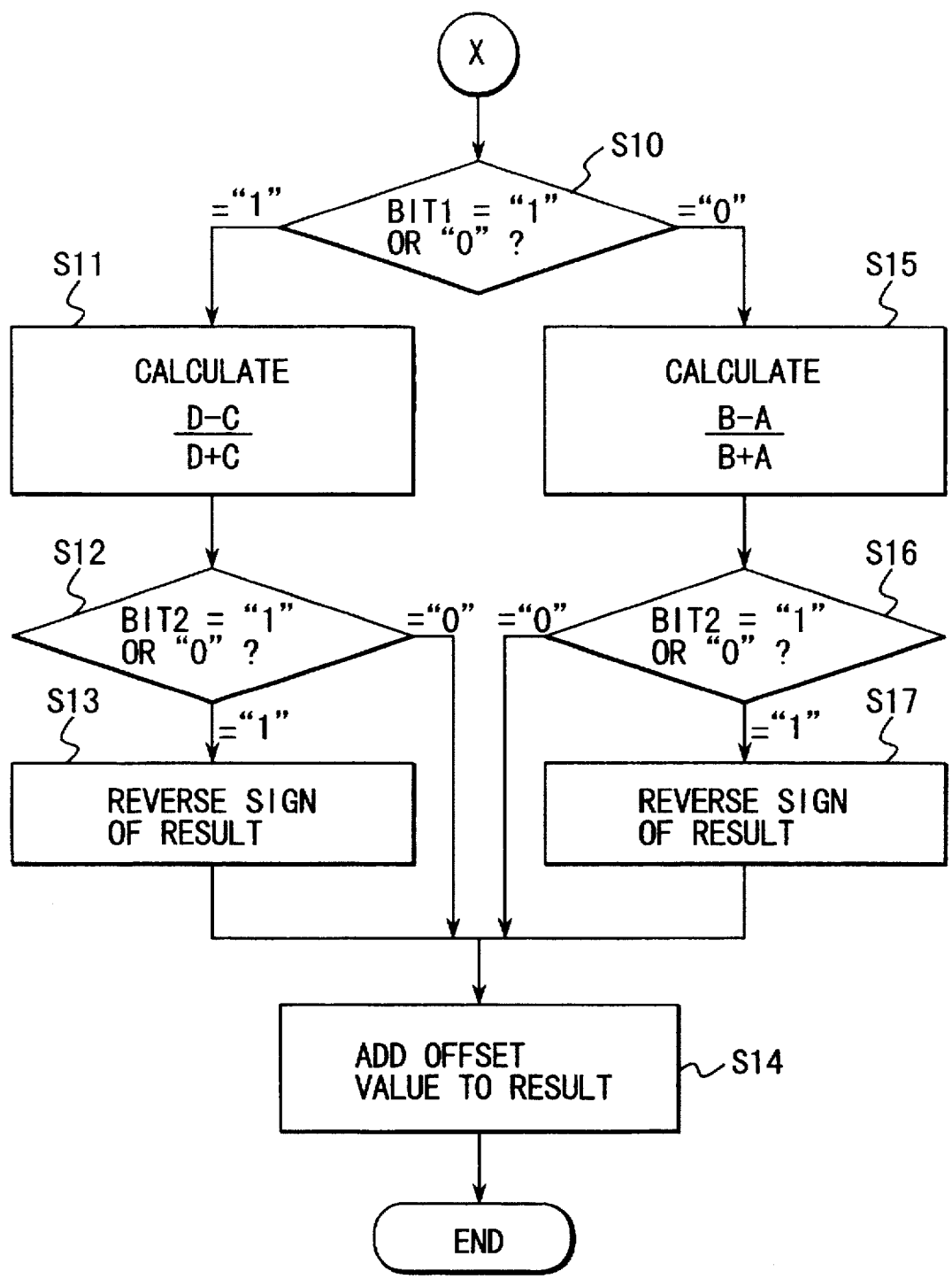
Figure 12:
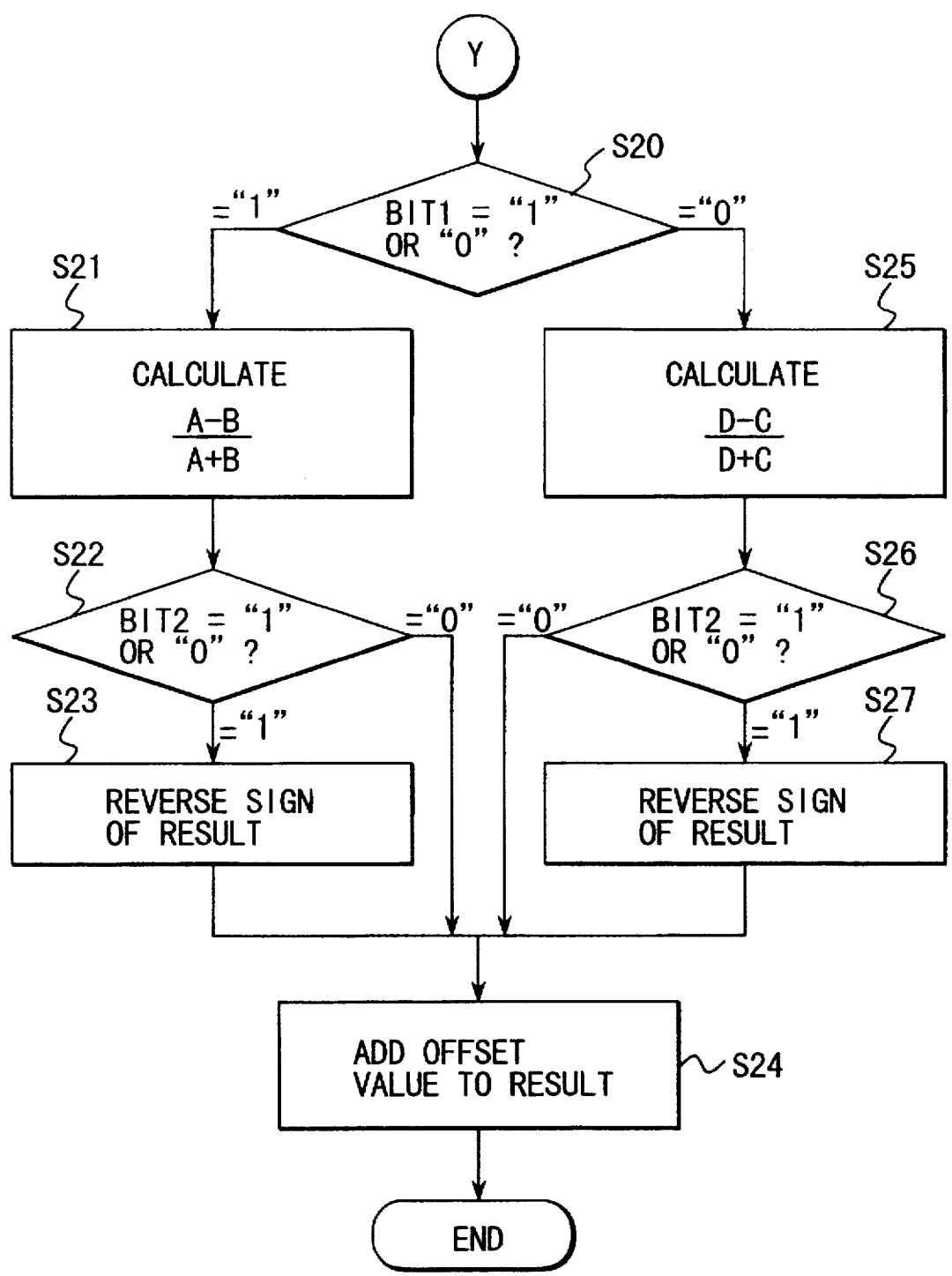
Figure 14:
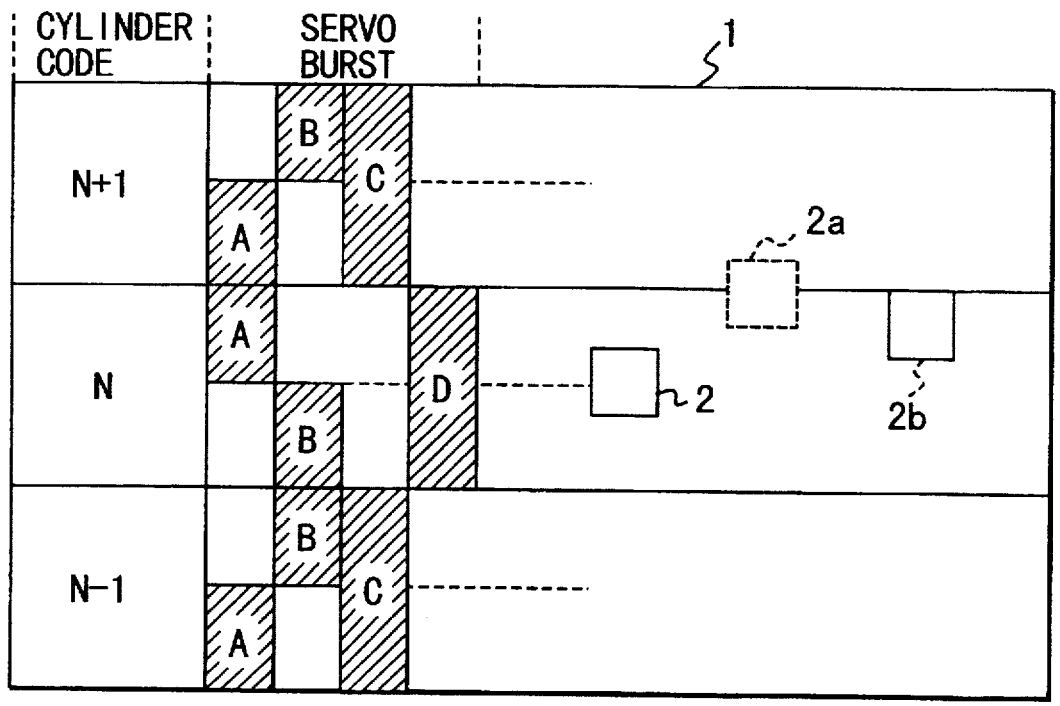
FIG. 14 shows the structure of the servo data related to a conventional disk drive.

In contrast, the fourth embodiment relates to a setting method of assuming the servo burst patterns A to D to be a single combination and allocating an absolute cylinder code to each combination. That is, 1.5 cylinder codes correspond to a single track. Specifically, as shown in FIG. 7, two tracks (N, N+1) on the system correspond to three absolute cylinder codes (K, K−1, K−2).

In the fourth embodiment, the CPU 15 records the relationship between the cylinder codes and tracks in the memory 16 in table form. With this method of allocating cylinder codes, for example, when placing the head in a position extending over cylinder codes K and K−1, the CPU 15 verifies the position of the track by comparison of servo burst pattern C or D in largeness or smallness. Specifically, as shown in FIG. 7, when the read head 10 exists in position H1 on track N, the CPU 15 senses the position H1 of the read head 10 on the basis of the cylinder code K and servo burst pattern D. When the read head 10 exists in position H2 on track N, the CPU 15 senses the position on the basis of the cylinder codes K, K−1 and servo burst patterns C, D. Furthermore, when the read head 10 exists in position H3 on track N+1, the CPU 15 senses the position on the basis of the cylinder codes K−1, K−2 and servo burst patterns C, D.

(Fifth Embodiment)

A fifth embodiment of the present invention relates to a method of performing a burst computing process (a position error computing process) when absolute cylinder codes are set so as to correspond to the individual tracks on a one-to-one basis in the servo burst pattern structure of the third embodiment. Hereinafter, the fifth embodiment will be described concretely by reference to FIGS. 8 to 13.

Figure 8:
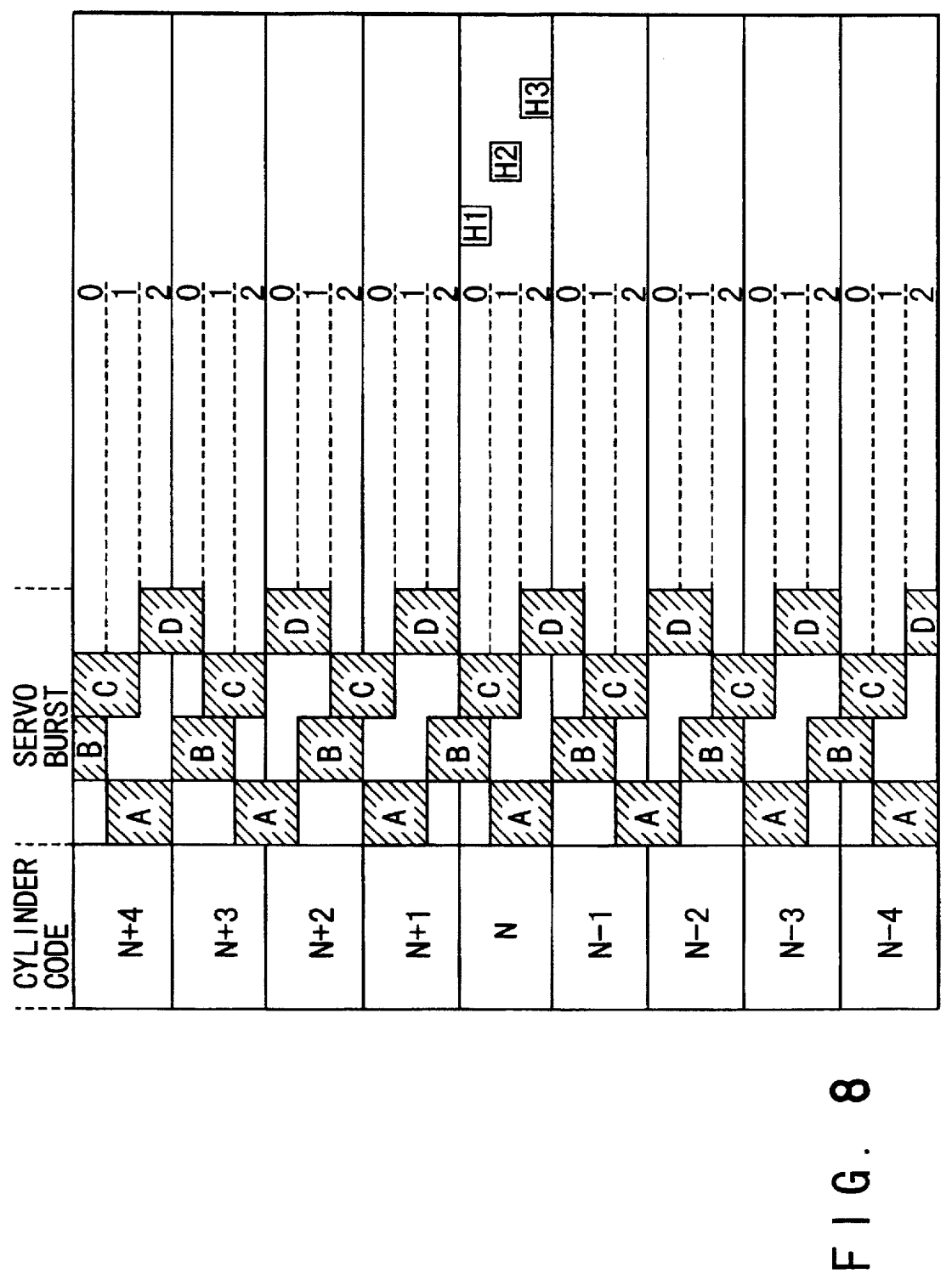

First, it is assumed that a track format is structured as shown in FIG. 8. As described earlier, the servo burst data is composed of servo burst patterns A to D recorded with a ⅔ track pitch. Absolute cylinder codes (N−4 to N+4) are set for the tracks (N−4 to N+4) so that they may correspond to each other on a one-to-one basis.

With such a structure, when the head 1 is positioned in the range of each track, a burst computing pattern using cylinder codes and servo burst data is the repetition of four patterns in frame 50 as shown in FIG. 9 in a case where the on-track positions in the range of the individual tracks is "0," "1," and "2."

(Positioning Control Operation)

The CPU 15, as shown in FIG. 10, receives the cylinder codes and servo burst data, while causing the head 2 to seek and verifies the present position of the read head 10 (steps S1 to S3). Then, the CPU 15 determines which one of the trisected positioning ranges in the range of the target track, the target position of the read head 10, the read head is located on (step S4). The trisected positioning ranges are the ranges (head positions H1 to H3) indicated by "0," "1," and "2" as shown in FIG. 8.

Here, the track for cylinder code N is assumed to be the target track on which the read head 10 is to be positioned. In the positioning range (0) of the target track (N), the CPU 15 checks to see if the first bit (hereinafter, referred to as BIT 1) in cylinder code (N) is "1" or "0" (step S10). If it is "0," the CPU 15 judges that the cylinder code (N) is an even-numbered cylinder and executes the burst computation of (B−A)/(B+A) (step S15). If it is "1," the CPU 15 judges that the cylinder code (N) is an odd-numbered cylinder and executes the burst computation of (D−C)/(D+C) (step S11).

Then, the CPU 15 checks to see if the second bit (hereinafter, referred to as BIT 2) in cylinder code (N) is "1" or "0." If it is "1," the CPU inverts the sign of the burst computation result, regardless of whether the cylinder code is an even or odd number (steps S12, S13 and S16, S17). The CPU 15 adds the offset amount to the burst computation result and causes the head to offset from the head positioning position to the target position (step S14).

Next, in the positioning range (1), the CPU 15 checks to see if BIT 1 in cylinder code (N) is "1" or "0" (step S20). If it is "0," the CPU 15 judges that the cylinder code (N) is an even-numbered cylinder and executes the burst computation of (D−C)/(D+C) (step S25). If it is "1," the CPU 15 judges that the cylinder code (N) is an odd-numbered cylinder and executes the burst computation of (A−B)/(A+B) (step S21).

Then, the CPU 15 checks to see if BIT 2 in cylinder code (N) is "1" or "0." If it is "1," the CPU inverts the sign of the burst computation result, regardless of whether the cylinder code is an even or odd number (steps S22, S23 and S26, S27). The CPU 15 adds the offset amount to the burst computation result and causes the head to offset from the head positioning position to the target position (step S24).

Then, in the positioning range (2), the CPU 15 checks to see if BIT 1 in cylinder code (N) is "1" or "0" (step S30). If it is "0," the CPU 15 judges that the cylinder code (N) is an even-numbered cylinder and executes the burst computation of (A−B)/(A+B) (step S35). If it is "1," the CPU 15 judges that the cylinder code (N) is an odd-numbered cylinder and executes the burst computation of (C−D)/(C+D) (step S31).

Then, the CPU 15 checks to see if BIT 2 in cylinder code (N) is "1" or "0." If it is "1," the CPU inverts the sign of the burst computation result, regardless of whether the cylinder code is an even or odd number (steps S32, S33 and S36, S37). The CPU 15 adds the offset amount to the burst computation result and causes the head to offset from the head positioning position to the target position (step S34).

As described above, when the read head 10 is positioned in the range of the target track (N), the head can be positioned easily and accurately by selecting the relevant one from the burst computation patterns (see FIG. 11) previously determined, according to one of the trisected positioning ranges (0 to 2).

What is claimed is:

1. A head positioning control system for a disk drive, comprising:

a disk with a plurality of tracks for recording data, each track having servo areas in a plurality of places on it, the servo areas being areas on which not only the track addresses for identifying the track when the head is moved to a specified track and the servo burst data for sensing the position of said head in the track range but also redundant data for identifying adjacent tracks have been recorded;

read means for reading said track address and said redundant data from the track on which said head is positioned;

detecting means for reading said servo burst data from the track on which said head is positioned and sensing the position of said head in the range of the track corresponding to said track address read by said read means; and control means for providing moving control of said head from the present position of said head to the specified track and determining the position of said head in the track range including the track corresponding to said track address and its adjacent tracks on the basis of said redundant data read by said read means, when the present position of said head is determined on the basis of said track address read by said read means.

2. A head positioning control system according to claim 1, wherein said redundant data is redundant bits added to said track addresses and is recorded on one boundary between a track and one of its adjacent tracks.

3. A head positioning control system according to claim 2, wherein said control means identifies the present position of said head on the basis of the presence or absence of said track address and said redundant bit when said head is located at the boundary between adjacent tracks.

4. A head positioning control system according to claim 2, wherein said control means determines which one of the boundary between the track corresponding to said track address and one adjacent track and the boundary between the track corresponding to said track address and the other adjacent track the present position of said head falls on according to the presence or absence of said redundant bit when determining the present position of said head on the basis of the track address obtained from said read means with said head being located at the boundary between adjacent tracks.

5. A head positioning control system according to claim 1, wherein said redundant data is recorded consecutively before or behind the areas on which said track addresses have been recorded and said read means reads said track address together with said redundant data according to the read operation of said head.

6. A head positioning control system according to claim 1, wherein said servo burst data is made up of a first group of quadrature servo patterns A, B and a second group of quadrature servo patterns C, D, and said servo burst patterns A to D are arranged at intervals of about a ⅔ track in the servo areas on said disk with each of a first positioning range with its center at the boundary between said first group of servo burst patterns A, B and a second positioning range with its center at the boundary between said second group of servo burst patterns C, D being formed with a ⅓ track pitch in each track range.

7. A head positioning control system according to claim 1, wherein said redundant data is the same as the low-order code when said track address is divided into the high-order code and the low-order code and is recorded in one of the boundaries with the adjacent tracks.

8. A head positioning control system according to claim 7, wherein said control means determines which one of the boundary between the track corresponding to said track address and one adjacent track and the boundary between the track corresponding to said track address and the other adjacent track the present position of said head falls on according to the low-order code serving as said redundant data when determining the present position of said head on the basis of the track address obtained from said read means with said head being located at the boundary between adjacent tracks.

9. A head positioning control system according to claim 7, wherein said redundant data is an absolute position code indicating the boundary between adjacent tracks.

10. A head positioning control system for a disk drive, comprising:

a disk with a plurality of tracks for recording data, each track having servo areas in a plurality of places on it, the servo areas being areas on which the track addresses for identifying the track when the head is moved to a specified track and the servo burst data for sensing the position of said head in the track range, said servo burst data being made up of a first group of quadrature servo patterns A, B and a second group of quadrature servo patterns C, D, and a first positioning range with its center at the boundary between said first group of servo burst patterns A, B and a second positioning range with its center at the boundary between said second group of servo burst patterns C, D being recorded with a ⅓ track pitch in each track range;

read means for generating the amplitude values for the position signals corresponding to said first group of servo burst patterns A, B and said second group of servo burst patterns C, D read by said head;

detecting means for calculating an error in the amplitude values of said first group of servo burst patterns A, B or an error in the amplitude values of said second group of servo burst patterns C, D read by said read means and sensing the position of said head in either said first positioning range or said second positioning range; and control means for providing positioning control of said head in the center of said first positioning range or said second positioning range in the track range on the basis of the position of said head sensed by said detecting means.

11. A head positioning control system according to claim 10, wherein said head is a recording and reproducing split-type head composed of a read head and a write head, the gap width of said write head is ⅔ or more of the track width, the range of said track, and each of said servo burst patterns A to D are recorded consecutively without joints on each track on said disk at intervals of about a ⅔ track.

12. A head positioning control system according to claim 10, wherein each of said tracks has an absolute cylinder code for identifying each track recorded on it.

13. A head positioning control system according to claim 10, wherein combinations of said servo burst patterns A to D are set on a block basis and an absolute cylinder code for identifying each of said tracks is allocated block by block.

14. A head positioning control system according to claim 10, wherein an even-numbered or odd-numbered cylinder code is set for each of said tracks, this cylinder code is caused to correspond to each positioning range obtained by trisecting the range of each of said tracks, and a burst computation pattern representing the burst computing process necessary for positioning control using said first group of servo burst patterns A, B and said second group of servo burst patterns C, D is set beforehand, and said control means moves said head to the target track on the basis of said absolute cylinder code, then executes the burst computing process corresponding to each of said positioning ranges in which said head is to be positioned in the range of said target track and thereby executes positioning control of said head.

* * * * *